United States Patent [19]

McKinnon

[11] 4,456,273
[45] Jun. 26, 1984

[54] LOAD-CARRYING TROLLEYS

[76] Inventor: Crerand McKinnon, 1 Stone Rd., Bromley, Kent BR2 9AX, England

[21] Appl. No.: 299,279

[22] Filed: Sep. 4, 1981

[30] Foreign Application Priority Data

Sep. 12, 1980 [GB] United Kingdom ............... 8029528
Dec. 9, 1980 [GB] United Kingdom ............... 8039458
Apr. 1, 1981 [GB] United Kingdom ............... 8110165

[51] Int. Cl.³ .............................................. B62B 3/02
[52] U.S. Cl. ............................ 280/33.99 H; 211/182; 403/217
[58] Field of Search ............... 280/33.99 R, 33.99 H, 280/33.99 S, 79.1 R, 79.3; 211/182, 195; 403/217, 61, 113, 164, 292

[56] References Cited

U.S. PATENT DOCUMENTS

| | | | |
|---|---|---|---|
| 2,774,609 | 12/1956 | Winger | 280/79.1 |
| 2,969,245 | 1/1961 | Wilson | 280/79.1 A |
| 3,333,874 | 8/1967 | Gelfarb | 403/217 |
| 3,582,102 | 6/1971 | Bewick | 280/33.99 T |
| 3,981,510 | 9/1976 | Gustafsson | 280/33.99 H |
| 4,346,906 | 8/1982 | Thorpe | 280/33.99 H |

FOREIGN PATENT DOCUMENTS

| | | | |
|---|---|---|---|
| 2252765 | 3/1973 | Fed. Rep. of Germany | 280/33.99 R |
| 1042227 | 9/1964 | United Kingdom | 280/79.1 R |
| 1201824 | 11/1967 | United Kingdom | 280/79.1 R |
| 1169317 | 12/1969 | United Kingdom | 280/33.99 R |
| 1298425 | 4/1971 | United Kingdom | 280/79.1 R |
| 1369553 | 3/1972 | United Kingdom | 280/79.3 |
| 1408776 | 10/1972 | United Kingdom | 280/33.99 H |
| 1407209 | 9/1975 | United Kingdom | 280/33.99 |
| 1569641 | 9/1977 | United Kingdom | 280/33.99 H |
| 2045698A | 11/1980 | United Kingdom | 280/33.99 H |
| 1594394 | 7/1981 | United Kingdom | 280/33.99 H |

Primary Examiner—David M. Mitchell
Assistant Examiner—Timothy Roesch
Attorney, Agent, or Firm—Nolte, Nolte and Hunter

[57] ABSTRACT

Load-handling trolleys of a type in which a load-supporting deck is displaceable into an out-of-use position and opposed load-retaining side walls can be pivoted about rear pivot axes to bring them into mutually inclined positions such that a number of such collapsed trolleys can be nested one into another. The trolley has a wheeled base unit to which the side walls are detachably connectable. The base unit comprises a bridge portion (4) and opposed side beams (2, 3) for supporting the load-retaining side walls. Such side beams are connected to the bridge portion by pivot joints (10, 11) so that the side beams can swing into mutually inclined positions together with the side walls.

2 Claims, 8 Drawing Figures

LOAD-CARRYING TROLLEYS

This invention relates to a load-carrying trolley comprising a load-supporting deck and opposed load-retaining side walls, the deck being displaceable from a horizontal working position into an out-of-use position and one or each of said side walls being pivotable relative to the other whereby the trolley, while stably supported by its wheels, can be converted from a use condition in which said side walls are substantially parallel with each other into a nestable condition in which said side walls are mutually convergent and the trolley can be nested with other like, similarly converted trolleys.

Many designs of such trolleys have been proposed, e.g. in French Pat. No. 2 367 646, U.S. Pat. No. 3,977,689 and United Kingdom Pat. Nos. 1,169,317, 1,382,660, 1,460,583, 1,429,834 and 1,445,727.

Trolleys of such previously proposed designs do not meet the performance specifications which many potential users now require.

An important potential field of use of trolleys of the kind in question is the wholesale distribution of unit loads of goods in large road transport vehicles. If such a vehicle is loaded with trolleys which have themselves been loaded with goods, then on arrival at a retail store the required loaded trolleys can be pushed into a goods reception area, unloaded at a convenient time, and then compactly stored in nested condition ready for collection by the wholesale goods distributor.

Because of the large quantities of trolleys handled by the distributor and retail stores, and the rapid handling of them which mass marketing conditions entail, it is highly desirable that the trolleys shall be capable of being quickly and easily converted from collapsed to working condition and vice versa and yet shall have good resistance to damage by the rough and frequent handling which they receive. It is also desirable that any relatively vulnerable parts of the trolleys, notably the side walls, which do become damaged can be removed and replaced without long delays.

Yet another desirable feature is that the trolleys should be capable of use with only two load-retaining walls, one on each of two opposed sides of the trolley. For many purposes a pair of opposed walls is all that is required for retaining the load and if the load space is entirely open on both of the other sides, the trolley is more versatile in regard to the situations in which it can be conveniently loaded and unloaded.

Trolleys which are designed so that only two opposed load-retaining walls are required, are well known and are in extensive use in the wholesale distribution of unit loads of goods (see e.g. United Kingdom Pat. No. 1,042,227). However these trolleys are not nestable. They incorporate a wheeled base unit and side walls which must be detached from the base unit in order to permit high density storage.

For various reasons the previously proposed nestable trolley designs cannot meet the performance standards in view. The designs are not compatible with the provision of a trolley which has the required resistance to damage by rough handling as above referred to. Moreover, in nearly all of the previously proposed designs it is necessary for there to be a third side wall for pivotally supporting the opposed side walls. In the exception, where there is no such third wall, the support of the opposed side walls is particularly poor and they are very likely to require replacement after only a short period of use.

It is an object of the invention to provide a nestable trolley which better fulfils the needs which have been described.

A trolley according to the present invention is defined in claim 1 hereof. The trolley is characterised in that said side walls are detachably connected to a base unit comprising a base frame which is mounted on the trolley wheels, said base frame comprising opposed wall-supporting side beams connected in spaced relationship by a bridge portion, at least one of said side beams, together with the corresponding one of said side walls, being pivotable relative to said bridge portion to permit said conversion of the trolley into said nestable condition.

Unlike many of the previously proposed nestable trolley designs, the trolley according to the invention comprises a nestable wheeled base unit, fabricated separately from the load-retaining side walls. The frame of this unit can be of robust construction while the independently fabricated side walls need have no greater strength than is required by their function of retaining a load on the load-supporting deck. The outward pressure of the load on such walls is not directly transmitted to any of the trolley wheels. The side walls are given underlying support by the base frame at all times, i.e. in the working and nestable and in-between conditions of the trolley. This is only possible because the base frame is constructed to include side beams one or each of which is pivotable relative to the intervening bridge portion. The side walls are therefore much less liable to suffer damage than are the side walls of those previously proposed nestable trolleys wherein the pivoting side walls are supported only by their hinges or by their hinges and by wheels attached to such walls.

Because the base unit supports the pair of opposed side walls at all times it is unnecessary to provide a fixed wall or other structure at an end of the load space such as is necessary in previously proposed designs for pivotally supporting the pair of oppposed side walls. Of course a third side wall, or even a third and a fourth side wall, can be provided if required. For example there may be a third side wall which can be hooked onto the said opposed side walls if and when a third wall is needed. Or a said additional wall could be hinged to one of the aforesaid opposed side walls so that it can be swung into a position against that side wall preparatory to nesting of the trolley. But in any case, it is not necessary for any such additional wall to support the aforesaid opposed side walls.

If only one of the side beams of the base is pivotally connected to the bridge portion the other side beam can be an integral extension of or rigidly connected to said bridge portion. In preferred embodiments of the invention both side beams are pivotally connected to the bridge portion of the base frame. The trolley can then be folded into a nestable condition in which it is symmetrical, which makes the trolley easier to propel in that condition.

The base frame can be constructed so that for bringing it into nestable condition, the side beams have to be swung away from one another so that they then diverge in a direction away from the bridge portion. However, in preferred trolleys according to the invention, at least one of the side beams is pivotable inwardly, i.e. into a position such that the side beams converge in a direction away from their pivot points. In this case the trolley takes up less floor space in its nestable condition. A particularly favoured base frame construction is one wherein the bridge portion is generally of V-form or of U-form with convergent sides and the side beams are pivotally connected to said bridge portion at or near its wider end so that the side beams can be pivoted inwardly towards said convergent sides of the bridge portion. The side beams can for example swing inwardly until they lie alongside said convergent sides of the bridge portion.

The base frame can be locked in its use condition in various ways. It is preferably locked by the load-supporting deck, by locking engagement of such deck with part of the base frame or with one or both of the attached side walls.

The connections between the opposed side walls and the frame of the base unit can be of a very simple form permitting the side walls to be quickly removed and replaced if and when necessary. Spigot and socket type connections are very suitable. They can very effectively support the walls substantially upright against outward tilting forces. Preferably each of the opposed side walls has depending spigot portions insertable into receptive sockets spaced apart along one side of the base frame.

It is preferable for each of the said opposed side walls, when it is connected to the base frame, to be within the plan width of the corresponding side beam of such frame. This feature is helpful for enabling collapsed containers to be closely nested with their side walls in close parallel relationship. When using spigot and socket connections between the side walls and base frame it is accordingly preferable for each of the sockets to extend into or through one of the side beams or into or through a side beam and the bridge portion of the base frame.

A particularly advantageous feature of preferred embodiments of the invention is the fact that the side beams of the base frame are pivotally connected to the bridge portion of the base frame by tubular pivot pins which also form sockets for the reception of spigots depending from the opposed side walls. The pivotal connection may be such that either side beam can easily be removed by removing the corresponding pivot pin. This is a very advantageous feature because it simplifies assembly of the base frame components during manufacture and enables the base frame to be easily dis-assembled or partly dis-assembled at any time, e.g. for replacing one of its components.

The side beams and the bridge portion of the base frame are preferably arranged so that the tops thereof lie in or substantially in a common horizontal plane.

The base frame components can be of tubular form. They are preferably of hollow rectangular section.

The load-supporting deck is preferably hinged to the base frame. Depending on the form of such frame, the deck can be hinged to the bridge portion or to one of the side beams. The deck is preferably in one piece. But it is within the scope of the invention for the deck to be formed in sections, e.g. by sections which can be folded one against the other, or by sections which are hinged to different side beams.

The invention includes a wheeled base unit to which opposed side walls can be connected to form a trolley according to the invention as hereinbefore defined.

It should be noted that provided the base unit can be locked in its use conditions in the absence of the opposed side walls, e.g. by locking engagement between the load supporting deck and a part or parts of the base frame, the base unit can be used, without side walls, as a roll-pallet.

Certain embodiments of the invention, selected by way of example, will now be described with reference to the accompanying diagrammatic drawings, in which.

Figure 1:
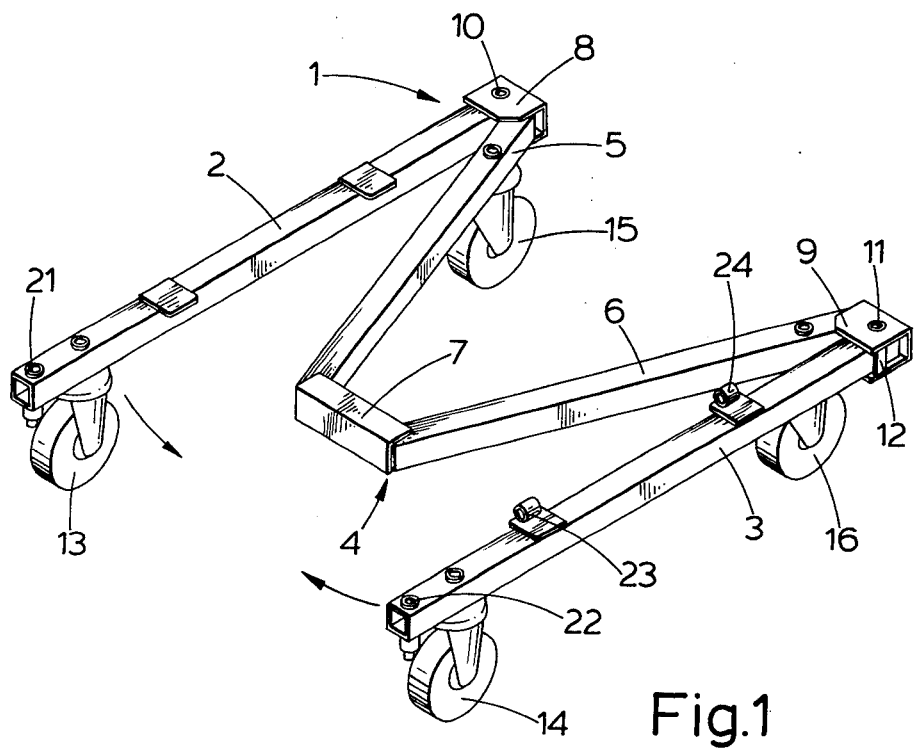
FIG. 1 shows part of the base unit of a trolley according to the invention.

The trolley which is the subject of FIGS. 1 to 5 comprises a base unit 1 (FIG. 1). This base unit comprises a frame mounted on wheels. The frame comprises rectangular section tubular side beams 2 and 3 pivotally connected to a bridge portion 4 which is of generally Vee shape in plan. The bridge portion is composed of convergent rectangular section tubular side pieces 5,6 whose ends at the apex of the Vee are welded to a cross-piece 7. It is convenient for this cross-piece to be of channel section into which the ends of the side pieces are inserted. Those ends can be cut square.

Figure 2:
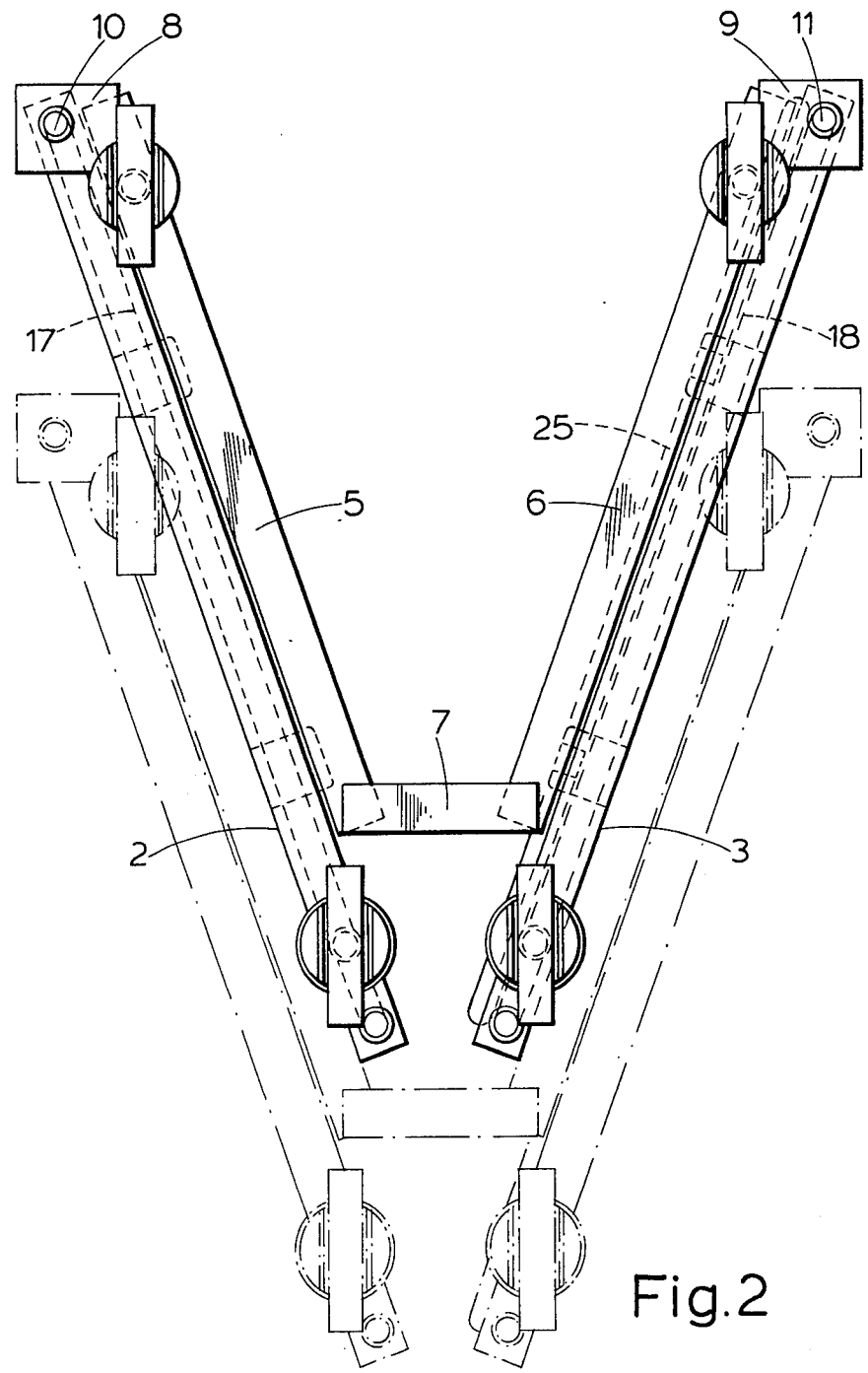
FIG. 2 is an under-plan view of the complete trolley in collapsed i.e. nestable condition.

Brackets 8,9 are welded to the other ends of the side pieces 5,6 of the bridge so as to project outwardly from such side pieces. These brackets are of channel form and the side beams 2,3 are pivotally connected into them by means of tubular hinge pins 10,11. As indicated by the arrows in FIG. 1, these hinge connections enable the side beams to be swung inwardly from their parallel positions shown in FIG. 1 into convergent positions in which they lie close alongside the side pieces of the bridge as represented in FIG. 2. The bracket channels are traversed by fixed stop means such as 12 which limit the outward movement of the side beams. The side beams abut the stops on reaching their parallel positions.

The frame is mounted on four wheels, 13-16. The two front wheels 13,14 are casters, i.e. wheels which automatically swing about vertical axes to assume the direction in which they are pushed. These casters are carried by the side beams 2,3 near their free ends. The rear wheels 15,16 are connected to the side pieces 5,6 of the bridge portion, near its wider end. These rear wheels are directionally fixed to run parallel with the longitudinally axis of the base unit i.e. parallel with the side beams 1 and 2 when these are in their parallel positions.

Figure 4:
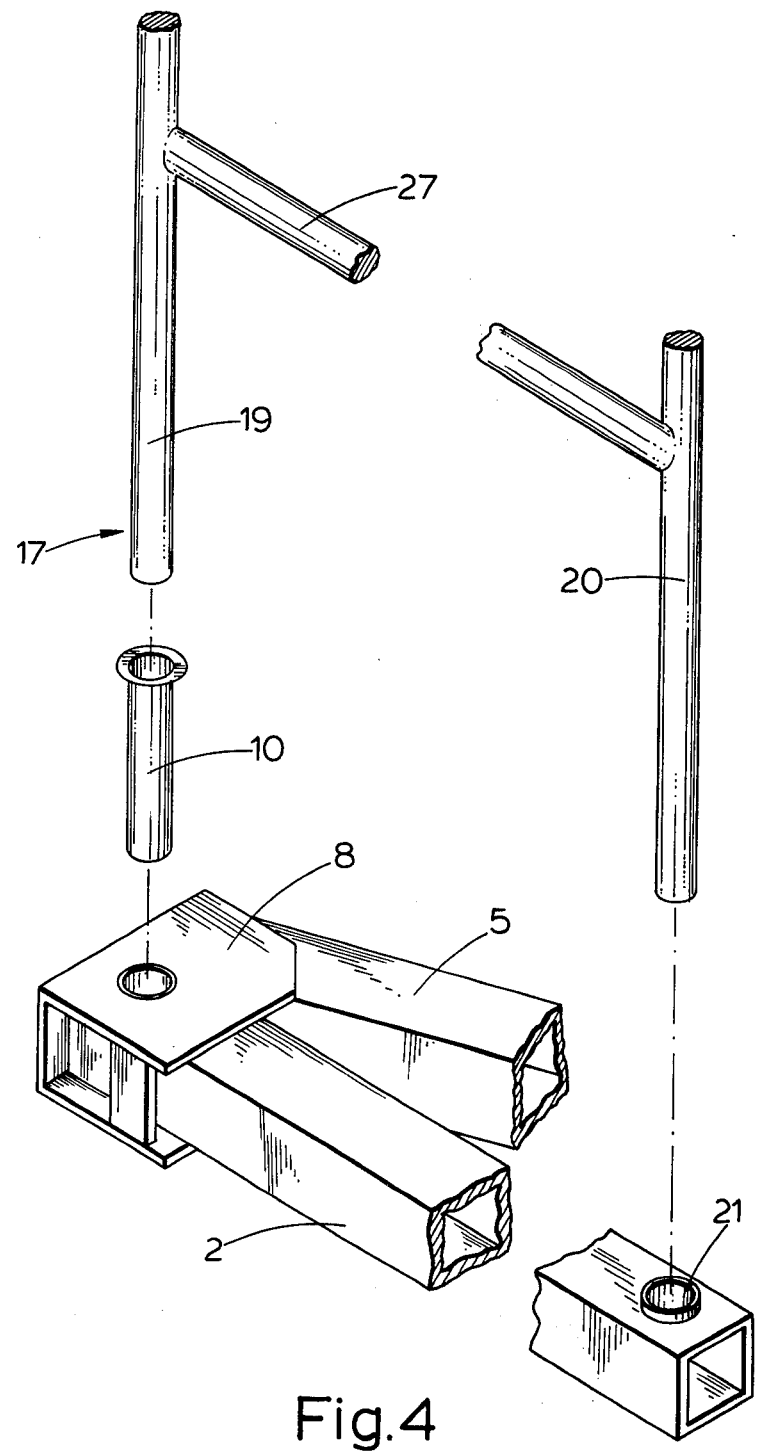
FIG. 4 shows details of the frame of the base unit shown in FIG. 1 and of a wall-to-base frame connection.

Side walls 17, 18 (FIGS. 2, 4 and 5) are connectable to the base unit 1 so that such walls are pivotable together with the side beams 2, 3 of the base frame. For this purpose the base frame is provided on each side thereof with front and rear sockets into which spigots 19, 20 on one of the side walls can be inserted as shown in FIG. 4. The two rear sockets are defined by the tubular hinge pins 10,11. The two front sockets are formed by similar tubular pins 21,22 which extend through the side beams 2,3 near their free ends. If desired, locking means may be employed for preventing withdrawal of the side walls until such locking means is released. The locking means may for example comprise locking pins inserted transversely through end portions of the side wall spigots 19,20 after their insertion through the sockets 10,21 or 11,22.

Figure 5:
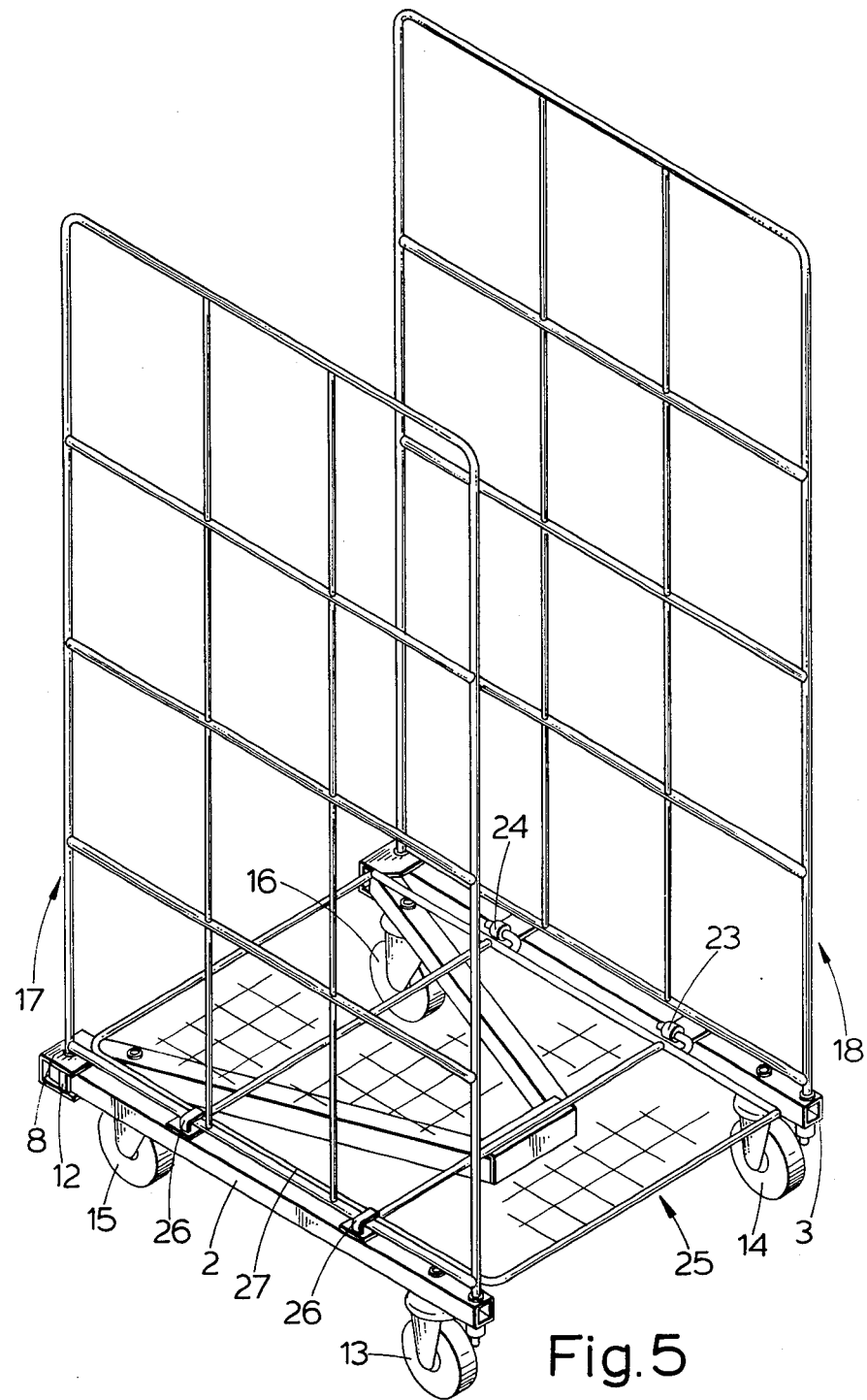
FIG. 5 is a view of the complete trolley in its use condition.

Side beam 3 carries hinge barrels 23,24 for receiving hinge pins secured to one side edge of a load-supporting deck 25 (FIGS. 2 and 5). This deck can be hinged upwardly from a horizontal load-carrying position into a substantially vertical position against the inside of side wall 18 as shown in FIG. 2. Once the deck has been hinged upwardly into this position and the side walls have been pivoted inwardly into their convergent positions shown in FIG. 2, the trolley can be nested with other like trolleys in a similarly folded condition. In FIG. 2 the position of a second such trolley is shown in broken outline. If required, fastening means (not shown) can be provided for fastening the load-supporting deck 25 in its raised position, against side wall 18. The edge of the deck opposite its hinged edge carries hook members 26. When the side walls are swung into their parallel positions and the deck 25 is lowered, these hook members engage a cross bar 27 on the corresponding side wall 17 so that the deck holds the side beams of the base frame, and the attached side walls, in their parallel positions. FIG. 5 shows the trolley in this use condition. This figure shows that the deck comprises a frame supporting a panel of wire mesh.

Figure 3:
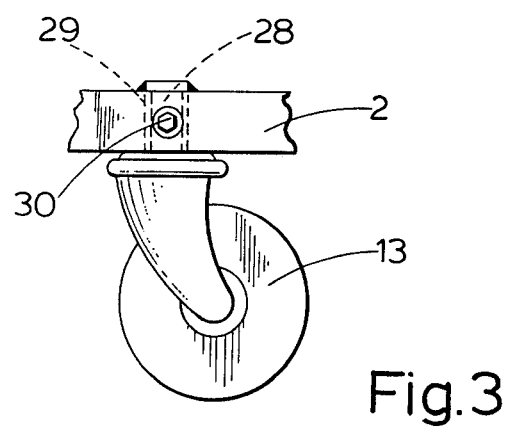
FIG. 3 shows details of the mounting of one of the trolley wheels.

FIG. 3 shows how the trolley wheel 13 is mounted. The wheel bracket has an upstanding stem 28 which is inserted into a sleeve 29 secured into the side piece 2 of the bridge portion of the frame. The stem is secured in position by a transverse bolt 30 which is inserted through a wall of such side piece and makes screw engagement with a threaded hole in such a sleeve. The other wheels of the trolley are secured in a similar manner to the respective portions of the base frame.

When the trolley shown in FIGS. 1 to 5 is in use, carrying a load, the load weight is supported by the base unit. The opposed side walls merely have to retain the load on the base unit. The outward pressure on these walls is not directly transmitted to the trolley wheels. If a side wall becomes damaged it can easily be removed, leaving the base unit ready for receiving a replacement wall. The base unit itself is of very robust construction. The base frame components can be very easily and quickly assembled by means of the hollow hinge pins 10,11. These pins can easily be removed at any time without deforming them. The side beams or bridge portion can be replaced by components of different size for making a base unit of different dimensions.

Various modifications can be made to the trolley shown in FIGS. 1 to 5, within the scope of the invention. For example: If only one of the side beams 2,3 were pivotable relative to the bridge portion 4, the other side beam and said bridge portion being fixed in their relative positions shown in FIG. 1, the trolley could still be nested (although not so neatly) into another collapsed trolley of the same form. If the base unit were capable of locking the base frame in operative condition without the side walls being in position the base unit could be used without such walls as a roll pallet. Such locking can for example be achieved by providing the edge of the deck opposite its hinged edge, and the side beam 2, with fastening components, e.g. pin and eye components, which interengage when the deck is lowered and the side beams are parallel.

The load-retaining side walls could be formed for releasably connecting to the base frame in a different manner, e.g. by nut and bolt fasteners. As a further alternative the base frame could be provided with channels or grooves into which bottom portions of the side walls can be inserted. However the spigot and socket joints are much preferred.

Figure 6:
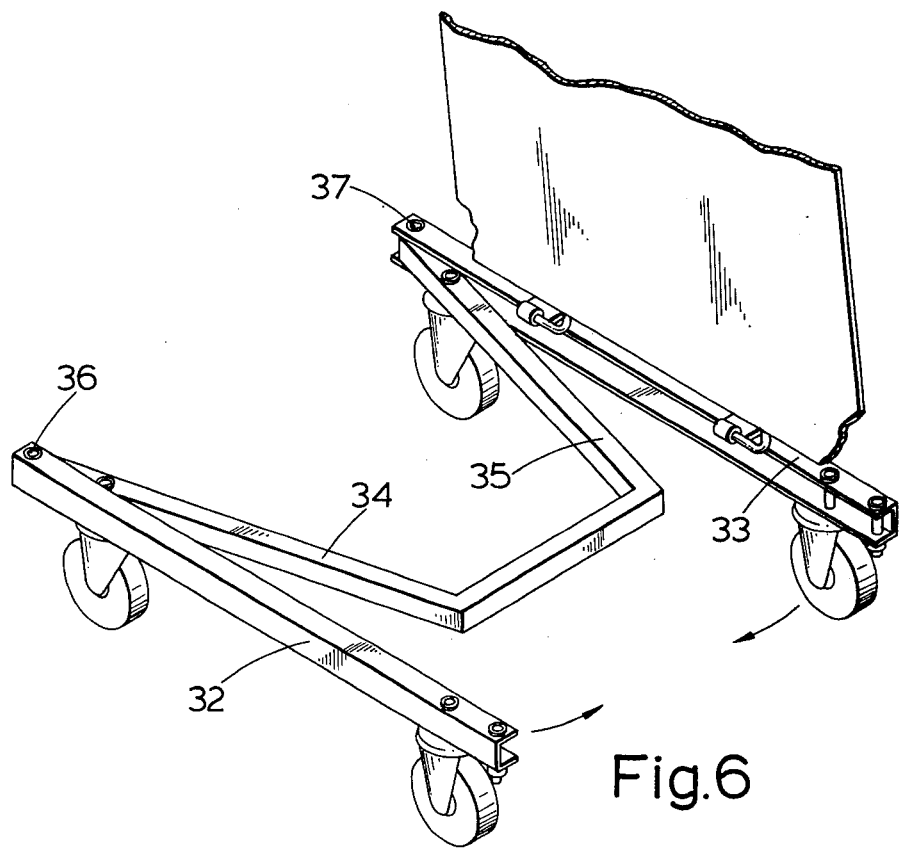
FIG. 6 shows part of the base unit of another trolley according to the invention.

FIG. 6 shows another base unit. The frame of this unit comprises side beams 32,33 which are of channel section. The side pieces 34, 35 of the bridge portion, which is of tapering U-form, intrude into the channels of such side beams. The side beams are pivotally connected to those intruding portions by hollow pivot pins 36, 37 which also form sockets for receiving rear spigots of the load-retaining side walls (not shown). In this construction therefore the axes of the rear wall spigots coincide with the axes of pivotal connection between the side beams and the bridge portion of the base frame.

Figure 7:
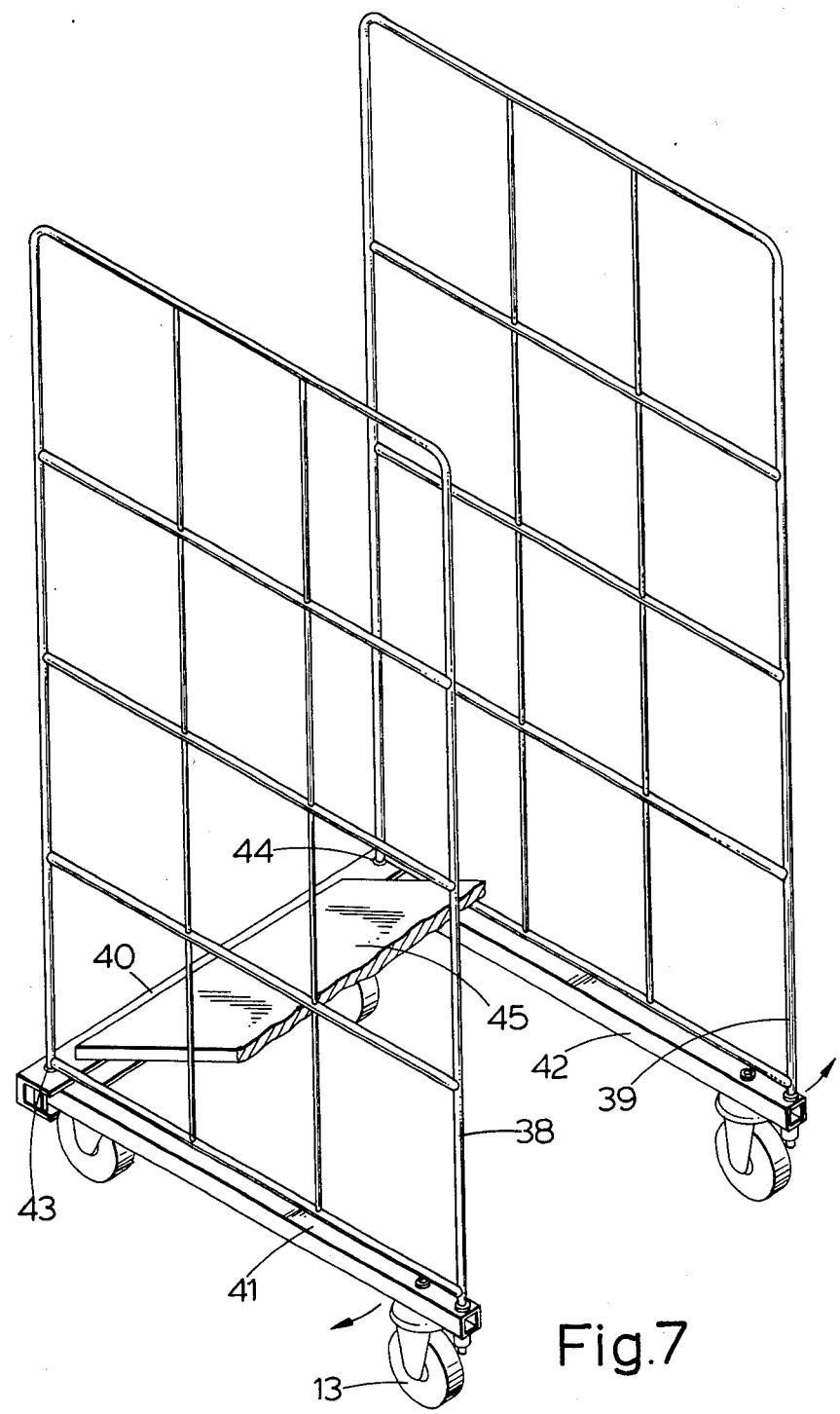
FIG. 7 is a view of a third trolley according to the invention.

The trolley of which a part is shown in FIG. 7 is constructed so that, unlike the trolleys of the earlier figures, its load-retaining side walls 38, 39 are hinged outwardly (as suggested by the arrow) for bringing the trolley into nestable condition. In this condition the side walls therefore diverge from their pivot points, as shown in the Figure. The bridge portion 40 is a straight bar of channel section. The side beams 41, 42 are square section tubes. The rear end portions of such side beams intrude into the channel in the bridge portion and are pivotally connected to such bridge portion by hollow pivot pins 43,44. Each side wall has front and rear spigots which are insertable into sockets in the base frame. The rear spigots are inserted into the sockets formed by the said pivot pins. The load-supporting deck 45 is hinged to the bridge portion 40. It is preferable for the deck to be raisable into a vertical or near vertical position so that the maximum space is available for a second trolley to be pushed as far as possible into nesting relationship with the first one. In the embodiment shown in FIG. 7, when the deck has been swung just beyond the vertical, the rear edge of the deck or a part attached thereto abuts against the bridge portion 40 so that the deck is supported in that raised position.

Figure 8:
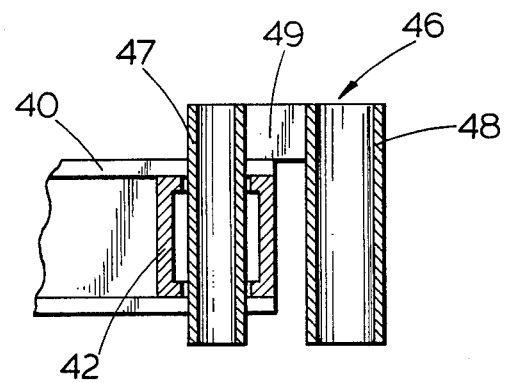
FIG. 8 is a detail view showing an adaptor component for use at a wall-to-base frame connecting point.

It is sometimes an advantage to be able to use a trolley for carrying a plurality of stacked base units of other like trolleys. This can be done by providing adaptors of the form shown in FIG. 8 for fitting onto the base frame. The adaptor 46 shown in FIG. 8 comprises two tubes 47,48 connected in parallel by a connecting piece 49. The tube 47 can be inserted into one of the sockets which would normally receive a spigot of a load-retaining side wall. FIG. 8 shows the adaptor inserted into the front socket of the side beam 41 of the base frame shown in FIG. 7, so that the larger diameter tube 48 lies on the outside of such side beam. Four such adaptors are fitted, one into each of the four spigot-receiving sockets of the base frame. The wide walls of the trolley can then be fitted into the four tubes 48. The side walls are thereby held at a sufficient spacing to enable complete base units of other trolleys to be stacked on the load-supporting deck. Such adaptors could of course equally well be used with a base unit as shown in FIG. 1 or FIG. 6.

An alternative way of adapting a trolley to hold stacked base units is to provide a pair of special side walls having spigot portions which are cranked so that when they are in position in the base frame sockets, the load-retaining parts of the walls lie in vertical planes outside the side beams of such base frame.

I claim:

1. A load-carrying trolley comprising a load-supporting deck and opposed load-retaining side walls, the said deck being raisable from its horizontal working position and said side walls being relatively pivotable from a mutually parallel relationship into a mutually convergent relationship which permits the trolley to be nested with other like, similarly converted trolleys, with the improvement that the trolley comprises a wheeled base unit which is independent of said side walls; said base unit comprises opposed side beams and an intervening bridge portion to which such side beams are pivotally connected by tubular pivot pins to allow said side beams to be pivoted in the horizontal plane into convergent relationship with each other; each side beam carries a supporting trolley wheel at a position towards the free end of such beam; and each of said side walls has a dependent spigot which is inserted into the socket defined by one of said tubular pivot pins and another depending spigot which is inserted into a socket located at another position along the corresponding side beam, the side walls thereby being detachably connected to the base unit so that they are supported by said side beams and move as a unit therewith in any said pivotal movement thereof.

2. A trolley according to claim 1, wherein said bridge portion of the base unit is of generally Vee-form in plan aspect and the side beams are pivotally connected to the convergent sides of such bridge portion in the vicinity of the wider end of that portion and so that said side beams, together with the attached side walls can be pivoted inwardly towards said convergent sides of said bridge portion.

* * * * *